US007142396B2

(12) United States Patent
Yao et al.

(10) Patent No.: US 7,142,396 B2
(45) Date of Patent: Nov. 28, 2006

(54) SYSTEM AND METHOD FOR DAMAGE PREVENTION BY IMPROVING THE SHOCK RESISTANCE OF A HARD DISK ACTUATOR ARM

(75) Inventors: Minggao Yao, Dongguan (CN);
Masashi Shiraishi, Hung Hom (HK);
Yiru Xie, Dongguan (CN)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 232 days.

(21) Appl. No.: 10/289,908

(22) Filed: Nov. 6, 2002

(65) Prior Publication Data

US 2003/0227719 A1    Dec. 11, 2003

(30) Foreign Application Priority Data

Jun. 5, 2002    (WO) .................... PCT/CN02/00391

(51) Int. Cl.
*G11B 5/48* (2006.01)
(52) U.S. Cl. .................................................... 360/256
(58) Field of Classification Search ................ 360/256, 360/254.7, 97.02, 97.03, 265.1, 245.7
See application file for complete search history.

(56) References Cited

U.S. PATENT DOCUMENTS

| 5,239,431 | A  | * | 8/1993  | Day et al. ................. 360/98.08 |
| 5,640,290 | A  | * | 6/1997  | Khanna et al. .......... 360/97.01 |
| 5,847,902 | A  |   | 12/1998 | Clifford, Jr. et al. |
| 5,870,252 | A  |   | 2/1999  | Hanrahan |
| 6,301,073 | B1 | * | 10/2001 | Gillis et al. ............... 360/97.01 |
| 6,341,051 | B1 | * | 1/2002  | Hachiya et al. .......... 360/265.1 |
| 6,373,666 | B1 | * | 4/2002  | Iida et al. ................ 360/254.7 |
| 6,417,991 | B1 | * | 7/2002  | Onda ......................... 360/128 |
| 6,473,270 | B1 | * | 10/2002 | McDonald et al. ...... 360/265.1 |
| 6,781,791 | B1 | * | 8/2004  | Griffin et al. ............... 360/128 |
| 6,956,723 | B1 | * | 10/2005 | Suzuki ....................... 360/255 |

FOREIGN PATENT DOCUMENTS

| JP | 3-168985    | * | 7/1991 |
| JP | 2001-35131  | * | 2/2001 |
| JP | 2001-67856  | * | 3/2001 |
| JP | 2001-176257 | * | 6/2001 |

* cited by examiner

*Primary Examiner*—Angel Castro
(74) *Attorney, Agent, or Firm*—Kenyon & Kenyon LLP

(57) ABSTRACT

A system and method are disclosed for improving the vibration/mechanical shock-resistance of a hard disk actuator arm. A guide block is located behind the actuator arm's angular range of motion, preventing over-flexure/vibration during operation, and/or the drive's actuator screw head diameter is increased to minimize arm vibration.

22 Claims, 5 Drawing Sheets

SYSTEM AND METHOD FOR DAMAGE PREVENTION BY IMPROVING THE SHOCK RESISTANCE OF A HARD DISK ACTUATOR ARM

BACKGROUND INFORMATION

The present invention relates to magnetic hard disk drives. More specifically, the present invention relates to a system for damage prevention by improving the shock resistance of a hard disk actuator arm.

There are several types of computer data storage devices. One is a hard disk drive (HDD). The HDD utilizes one or more magnetic disks to store the data and one or more heads to read data from and write data to the disk(s). As advances have occurred in the art of hard drive and other computer technology, hard drives and their associated computer systems have become small enough to enable portability. Along with the portability of such systems, comes an increased risk of shock or vibration causing either impaired read/write ability or damage to the hard drive.

If a hard drive experiences severe vibration or mechanical shock, the actuator arm, which positions the head over the magnetic disk, may impact the disk, potentially damaging either the head or disk or both. In addition, damage may occur to components such as the arm suspension and physical and electrical connections. Further, if a micro-actuator system is utilized for fine-tuning of head placement, damage could occur to the micro-actuator itself. In the art today, different methods are utilized to prevent such damage.

FIG. 1 illustrates a typical method utilized to prevent damage caused by shock or vibration to a hard drive. A stationary ramp 102 is located near the outer edge of the disk 104. When the head 106 is moved beyond the edge of the disk, it rides onto the ramp 102, where it is 'parked' in a safe, restrained position. One problem with this design is that it is only effective during hard drive non-operation. It is unable to prevent damage during normal drive operation when the head 106 is reading data from and writing data to the disk 104. Further, a ramp 102 may only be used with 'diagonal arm orientation' hard drives 108, as shown in FIG. 1a. Because of space limitations, a ramp 112 may not be utilized with 'perpendicular arm orientation' hard drives 110, as shown in FIG. 1b.

FIG. 2 provides an illustration of another method of preventing shock/vibration-associated damage, which involves the utilization of a stationary 'comb'. As shown in FIGS. 2a (top view) and 2b (side view), the comb 206 is affixed to the hard drive casing 212 in a location such that each of the disks 202 and each of the arms 204 has a position interposed between 'teeth' 208 of the comb 206 throughout the arm's 204 range of motion (See FIG. 3, also).

FIG. 3 provides another illustration of the 'comb' method of arm stabilization. FIGS. 3a and 3b show the arms 304 at the opposite end of their range of motion 314. One disadvantage of the 'comb' method is that there is a substantial portion (the load beam 316) of the arm 304 that is unconstrained by the comb 306. This portion 316 of the arm is free to move toward and away from the disk 302 under vibration or mechanical shock in a 'spring-like' manner. Another disadvantage is that the comb 306 supports only the base plate portion 318 of the arm and not the suspension (load beam 316) of the head 320 (discussed below). Further, the distance from the support of the comb 306 to the head 320 is relatively large, allowing for substantial displacement of the head under shock/vibration. It is therefore desirable to have a system for improving the shock resistance of a hard drive actuator arm in addition to other advantages.

DETAILED DESCRIPTION

Figure 1B:
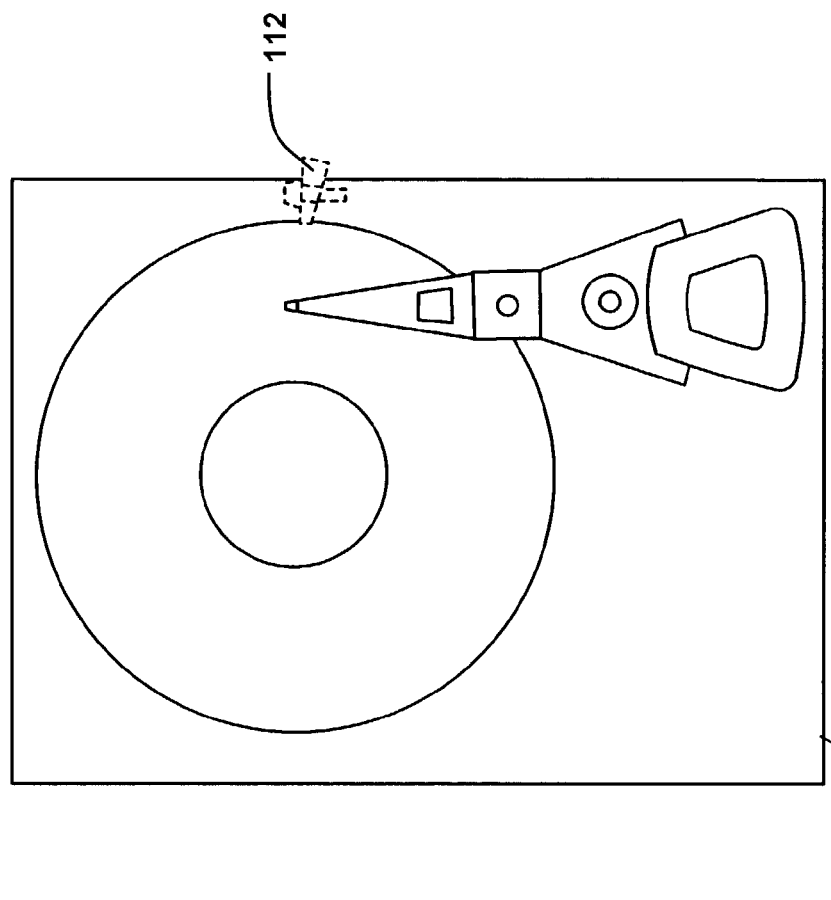
FIG. 1 illustrates the 'ramp' method for preventing damage caused by shock or vibration to a hard drive.
Figure 1A:
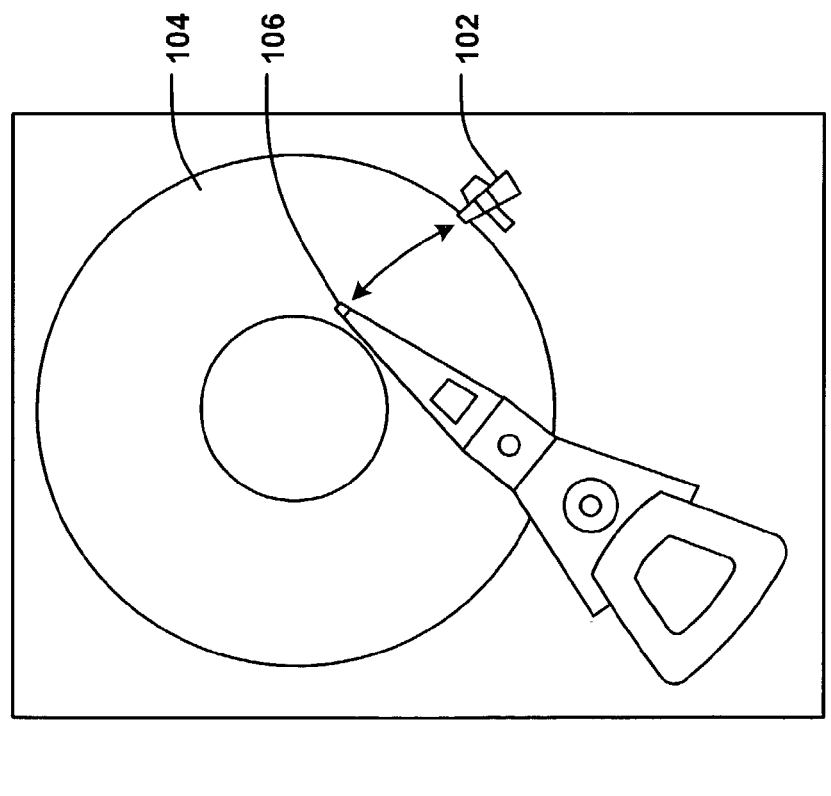
Figures 2A, 2B:
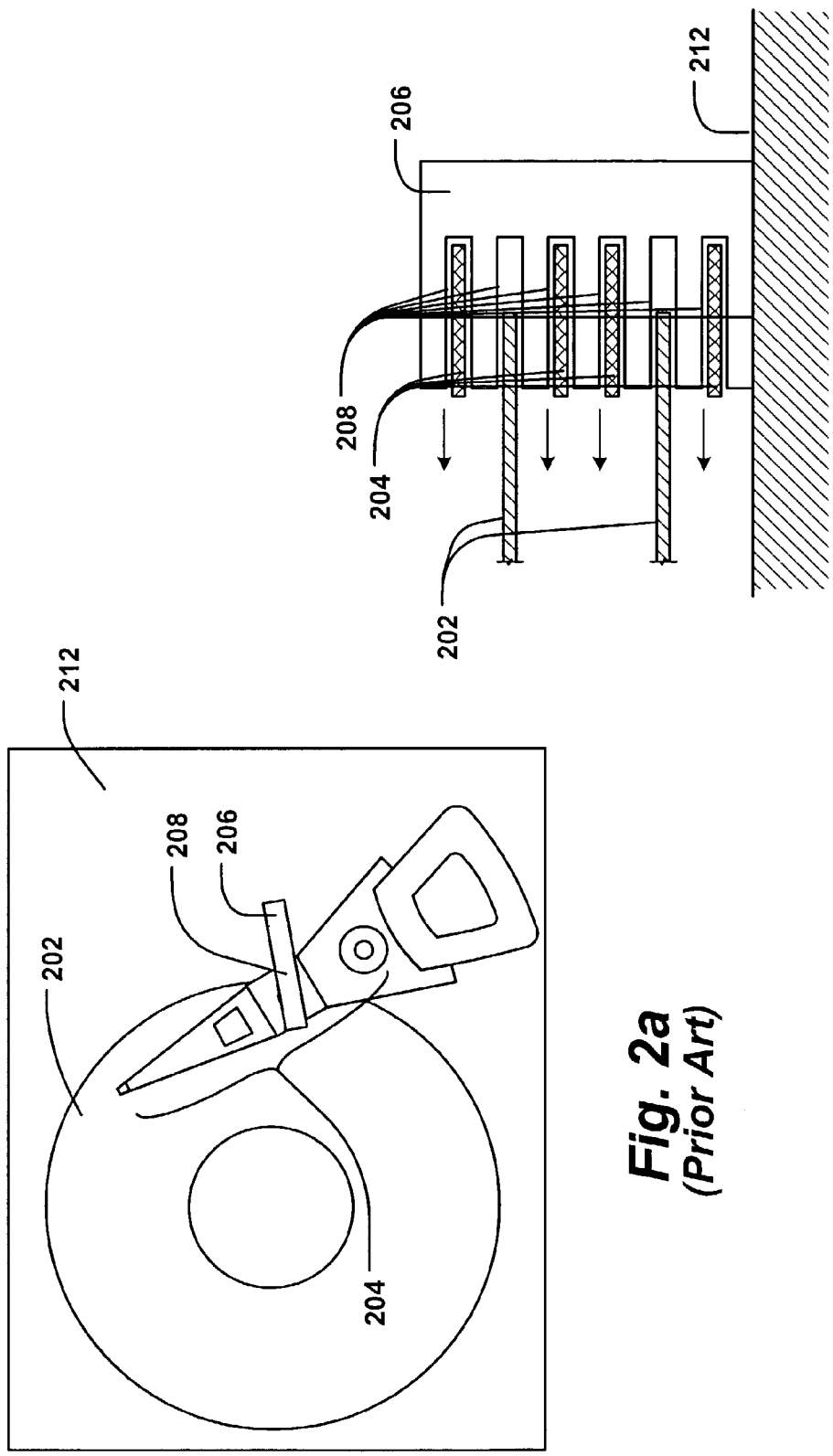
FIG. 2 provides an illustration of another method of preventing shock/vibration-associated damage, which involves the utilization of a stationary 'comb'.
Figure 3:
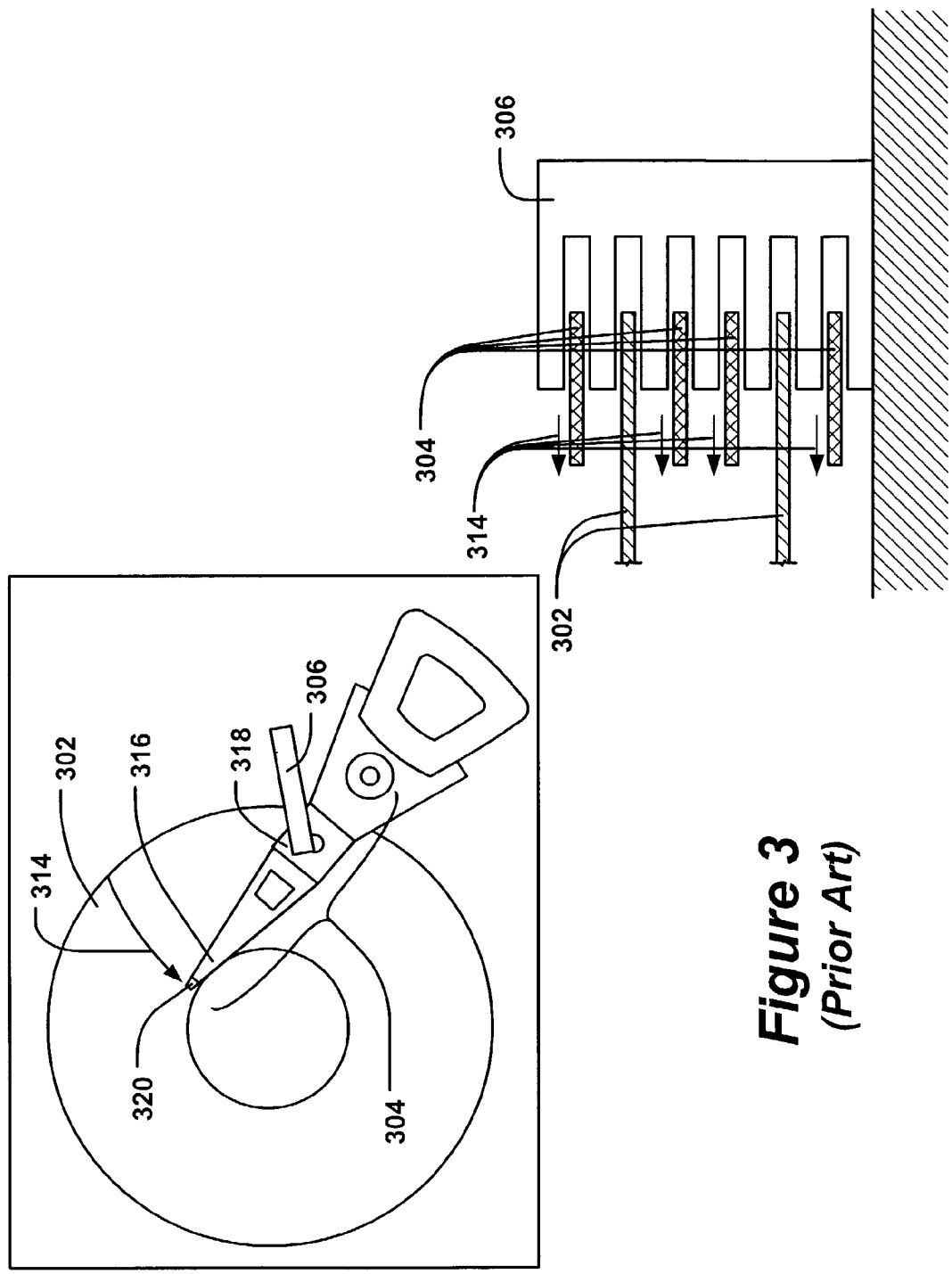
FIG. 3 provides another illustration of the 'comb' method of arm stabilization.
Figure 4B:
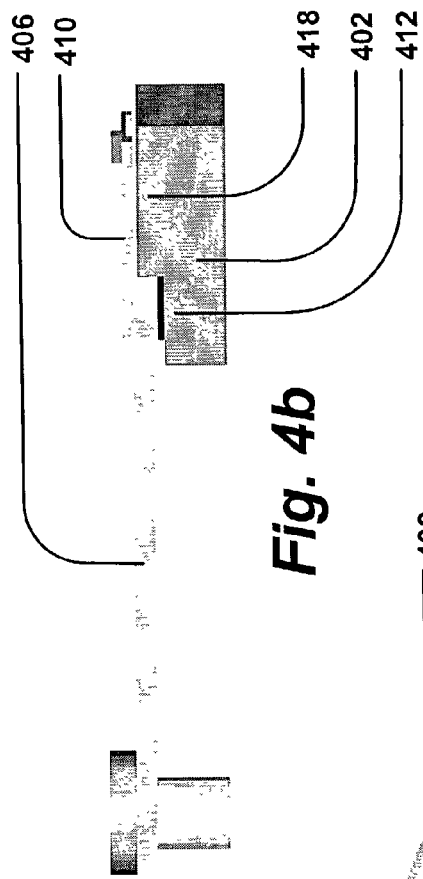
FIG. 4 illustrates a single-head hard drive utilizing an actuator arm guide block under principles of the present invention.
Figure 4A:
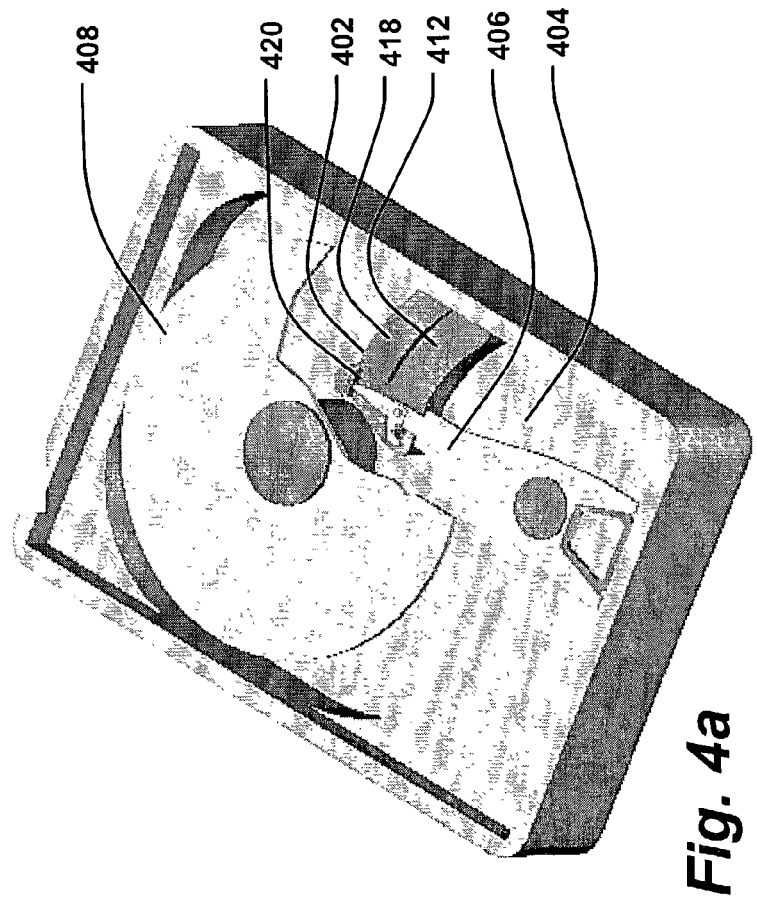

To improve shock resistance of the hard drive, in one embodiment of the present invention, a guide block is provided to support/restrain the actuator arm from behind (i.e., the side facing away from the surface of the disk). FIG. 4 illustrates a single-head hard drive utilizing an actuator arm guide block under principles of the present invention. FIG. 4a provides a perspective view of a hard drive with guide block, and FIG. 4b provides a side view of the actuator arm and guide block under principles of the present invention. In one embodiment, an 'arc'-shaped guide block 402 is coupled to the hard drive casing 404 behind the actuator arm 406 to prevent the arm 406 from flexing away from the disk 408 during shock or vibration. The arm 406 is thus not allowed to bend away (downward, in this illustration) from the disk 408, preventing damage to the arm (over-flexure) and/or disk (by impact upon return swing). In one embodiment, the guide block 402 is shaped to follow the path of the head suspension (load beam) 410 through the arm's 406 angular range of motion.

In one embodiment, the guide block 402 is made of a metal, such as stainless steel; in another embodiment, the guide block 402 is made of a polymer, such as polyethylene, polyester, or polyamide; and in another embodiment, the guide block 402 is ceramic.

In one embodiment, the guide block 402 has two different surfaces (steps). The first step 412 supports the main portion of the arm 406, and the second step 418 supports the load beam portion (suspension) 410. This design allows the load beam 410, which can articulate somewhat with respect to the main portion of the arm 406, to be supported independently. In one embodiment, a portion of the guide block 402 near the center of the disk 408 serves as a load/unload station 420 to constrain the arm 406 during non-operation of the hard drive.

Figure 5B:
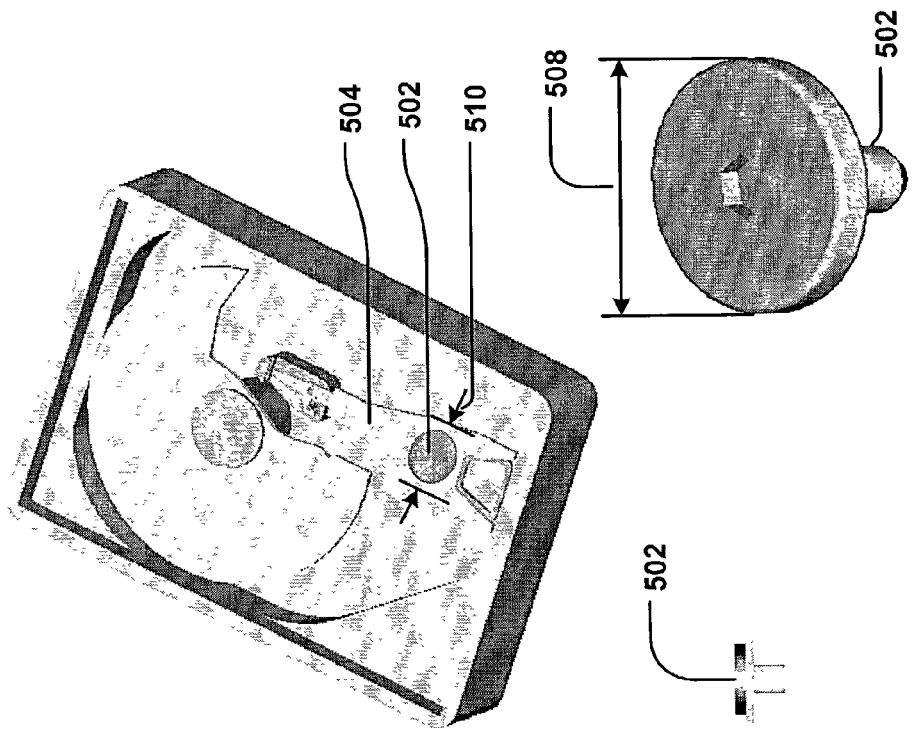
FIG. 5 illustrates increasing the diameter of the actuator screw under principles of the present invention.
Figure 5A:
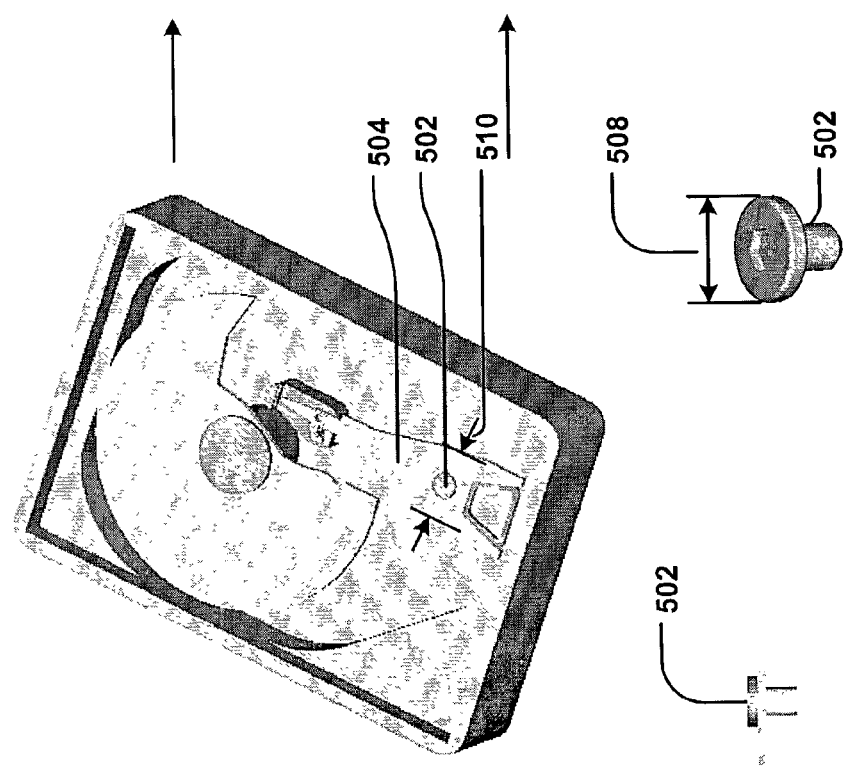

In one embodiment of the present invention, an actuator screw is utilized that has a head (crown) large enough to reduce arm vibration. FIG. 5 illustrates increasing the diameter of the actuator screw 502 under principles of the present invention. Common in the art today is a screw head diameter of 5.3 millimeters (mm). In one embodiment, a screw with a larger-diameter head 502 provides axially-directed compression upon the arm over a greater area, thus reinforcing and stabilizing the arm 504 under that area. Further, it provides pressure farther away from the axis, giving a greater moment for resisting vibration/shock-induced flexure (torsion). In one embodiment, an actuator screw 502 with a head diameter of 8.4 millimeter (mm) is utilized with a 3.0 inch hard drive. In one embodiment, an 8.4 mm screw head 502 is utilized with a 3.5 inch hard drive. Preferably, in 3.5 inch hard drives, the head diameter of the screw is between 8.4 mm and 9.4 mm to achieve the vibration/shock resistance of the present invention. In another embodiment, a generally 8.4 mm head diameter screw 502 is utilized to provide the benefits of a large-headed screw 502, yet satisfy space limitations of a 3.5 inch hard drive such as the Maxtor Nike 3.5 inch drive. This provides a screw head diameter 508 that is 44.9% the width 510 of the arm (at the midpoint of the screw and perpendicular to the length of the arm 504) for a hard drive such as the Maxtor Nike 3.5 inch platform, which has an arm width 510 of 18.7 mm. Preferably, in 3.5 inch hard drives, the ratio between head diameter and arm width is between 28.3% and 50.3% to achieve the vibration/shock resistance of the present invention.

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A system to improve shock resistance of a data storage device comprising:
  a guide block coupled opposite a recording surface to restrain an arm element from a defined degree of flexure, said arm element capable of rotation around an axis point and between said guide block and the recording surface, without said guide block protruding between the recording surface and the arm element.

2. The system of claim 1, wherein the guide block is of a material selected from the group consisting of stainless steel, polyethylene, polyester, polyamide, and ceramic.

3. The system of claim 1, wherein the data storage device is a computer hard disk drive.

4. The system of claim 3, wherein the recording surface is a magnetic disk.

5. The system of claim 4, wherein the arm element is a hard drive actuator arm.

6. The system of claim 5, wherein the guide block includes a load/unload station, said arm element capable of being positioned onto said station for stabilization during non-operation.

7. The system of claim 4, wherein the arm element includes a main portion and a suspension portion.

8. The system of claim 7, wherein the guide block includes an area for supporting the main portion and an area for supporting the suspension portion.

9. The system of claim 8, wherein the guide block includes an arc-shaped step, said main portion to be supported by a lower plane of the step and said suspension portion to be supported by an upper plane of the step.

10. The system of claim 1, wherein the guide block is shaped to support the arm element during operation of the data storage device.

11. The system of claim 1, wherein the guide block is shaped to follow the movement of the arm element.

12. A method to improve shock resistance of a data storage device comprising:
  restraining, by a guide block, an arm element from a defined degree of flexure, said arm element capable of rotation around an axis point and between said guide block and a recording surface, said guide block coupled opposite said recording surface and not protruding between the arm element and the recording surface.

13. The method of claim 12, wherein the guide block is of a material selected from the group consisting of stainless steel, polyethylene, polyester, polyamide, and ceramic.

14. The method of claim 12, wherein the data storage device is a computer hard disk drive.

15. The method of claim 14, wherein the recording surface is a magnetic disk.

16. The method of claim 15, wherein the arm element is a hard drive actuator arm.

17. The method of claim 16, wherein the guide block includes a load/unload station, said arm element capable of being positioned onto said station for stabilization during non-operation.

18. The method of claim 15, wherein the arm element includes a main portion and a suspension portion.

19. The method of claim 18, wherein the guide block includes an area for supporting the main portion and an area for supporting the suspension portion.

20. The method of claim 19, wherein the guide block includes an arc-shaped step, said main portion to be supported by a lower plane of the step and said suspension portion to be supported by an upper plane of the step.

21. The method of claim 12, wherein the guide block is shaped to support the arm element during operation of the data storage device.

22. The method of claim 12, wherein the guide block is shaped to follow the movement of the arm element.

\* \* \* \* \*